US010867079B2

(12) United States Patent
Hart

(10) Patent No.: US 10,867,079 B2
(45) Date of Patent: *Dec. 15, 2020

(54) INTRINSIC USE CONTROL FOR SYSTEM AND USE CONTROLLED COMPONENT SECURITY

(71) Applicant: LAWRENCE LIVERMORE NATIONAL SECURITY, LLC, Livermore, CA (US)

(72) Inventor: Mark Miles Hart, Livermore, CA (US)

(73) Assignee: LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/034,080

(22) Filed: Jul. 12, 2018

(65) Prior Publication Data
US 2018/0357424 A1 Dec. 13, 2018

Related U.S. Application Data

(60) Continuation of application No. 14/841,116, filed on Aug. 31, 2015, now Pat. No. 10,102,382, which is a
(Continued)

(51) Int. Cl.
G06F 21/57 (2013.01)
G06F 21/88 (2013.01)

(52) U.S. Cl.
CPC .............. G06F 21/88 (2013.01); G06F 21/57 (2013.01); G06F 2221/2141 (2013.01)

(58) Field of Classification Search
CPC combination set(s) only.
See application file for complete search history.

(56) References Cited

U.S. PATENT DOCUMENTS

| 8,375,219 B2* | 2/2013 | Westerinen | G06F 21/51 |
| | | | 713/187 |
| 2006/0168365 A1* | 7/2006 | Martinez | G06F 12/1081 |
| | | | 710/22 |

(Continued)

OTHER PUBLICATIONS

United States Patent and Trademark Office (USPTO), Non-final Office Action dated Aug. 5, 2015 for related U.S. Appl. No. 13/803,568 (pp. 1-10) with claims examined (pp. 11-15).
(Continued)

*Primary Examiner* — Khoi V Le
(74) *Attorney, Agent, or Firm* — O'Banion & Ritchey LLP; John P. O'Banion

(57) ABSTRACT

An Initialization Unit (IU) initiates an initial secure connection with an Intrinsic Use Control (IUC) Chip based on very large random numbers (VLRNs). The IUC Chip in turn initiates a secondary secure connection between it and one or more Use Controlled Components (UCCs). Polling by the IU allows confirmation of an ongoing secure connection, and also allows the IUC Chip to confirm the secondary secure connection to the UCCs. Removal or improper polling response from one of the UCCs results in a response from the IUC Chip that may include notification of tampering, or temporary or permanent discontinued operation of the offending UCC. Permanent discontinued operation may include destruction of the offending UCC, and cascaded discontinued operation of all other UCCs secured by the IUC Chip. A UCC may in turn be another nested layer of IUC Chips, controlling a corresponding layer of UCCs, ad infinitum.

5 Claims, 11 Drawing Sheets

Related U.S. Application Data division of application No. 13/803,568, filed on Mar. 14, 2013, now abandoned.

(56) References Cited

U.S. PATENT DOCUMENTS

| | | | | |
|---|---|---|---|---|
| 2010/0011265 A1* | 1/2010 | Tamura | ............... | G06F 13/38 |
| | | | | 714/734 |
| 2010/0250637 A1* | 9/2010 | Shim | ............... | G06F 7/58 |
| | | | | 708/250 |
| 2011/0191399 A1* | 8/2011 | Johnston, II | ............... | G06F 7/588 |
| | | | | 708/250 |
| 2013/0094271 A1* | 4/2013 | Schuetz | ............... | G11C 7/10 |
| | | | | 365/63 |
| 2014/0173346 A1* | 6/2014 | Bastimane | ............... | G11B 5/012 |
| | | | | 714/30 |
| 2014/0223269 A1* | 8/2014 | Wang | ............... | G06F 13/4286 |
| | | | | 714/819 |

OTHER PUBLICATIONS

United States Patent and Trademark Office (USPTO), Final Office Action dated Nov. 30, 2015 for related U.S. Appl. No. 13/803,568 (pp. 1-12) with claims examined (pp. 13-14).
United States Patent and Trademark Office (USPTO), Non-final Office Action dated Aug. 28, 2017 for related U.S. Appl. No. 14/841,116 (pp. 1-8) with claims examined (pp. 9-13).
United States Patent and Trademark Office (USPTO), Final Office Action dated Dec. 29, 2017 for related U.S. Appl. No. 14/841,116 (pp. 1-7) with claims examined (pp. 8-11).

* cited by examiner

INTRINSIC USE CONTROL FOR SYSTEM AND USE CONTROLLED COMPONENT SECURITY

CROSS-REFERENCE TO RELATED APPLICATIONS

This application is a continuation of U.S. patent application Ser. No. 14/841,116 filed on Aug. 31, 2015, incorporated herein by reference in its entirety, which is a division of U.S. patent application Ser. No. 13/803,568 filed on Mar. 14, 2013, incorporated herein by reference in its entirety.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to use controlled components (UCCs), more particularly to use controlled components in secured systems, and still more particularly to prevention of misuse of stolen or misappropriated UCCs for improper purposes.

2. Description of Related Art

Present day weapons are complex devices with several integral components necessary for proper function. By disabling one or more of these components, the weapon will not function as intended. However, it is still theoretically possible to acquire a collection of these individual weapon components and assemble them into a functional weapon.

BRIEF SUMMARY OF THE INVENTION

In one aspect of the invention, an integrated use control system may comprise: a. an Intrinsic Use Control (IUC) Chip; and b. one or more use controlled components (UCCs) in data communication with the IUC Chip; c. wherein each UCC is capable of at least one use; d. wherein, if any UCC fails to receive a correct IUC Chip ID Number from the IUC Chip, then that UCC becomes inoperative for its use.

The integrated use control system above may further comprise: a. a use control Integrated Circuit (IC); b. whereby the UCC is capable for its use only upon approval by the use control Integrated Circuit (IC). In such a system, the data communication between each UCC and the IUC circuit may comprise a Bidirectional Digital Communications (BDC).

The use controlled component (UCC) may be selected from a group of components consisting of: a sensor, a reader, a scanner, an imaging device, a detector, a receiver, a global positioning system, a navigation device, a control surface, a control valve, a power supply, a control device, a logic controller, an actuator, a transmitter, a transducer, a receiver, a communication system, an energy storage device, an energy delivery device, a power delivery device, a motor, an engine, a steering device, an initiating device, a voting machine, a Pitot tube, an aileron, an engine throttle, a communication link, a closed circuit television camera (CCTV), an access control device, a remotely operated electrical switch gear, a vehicle sensor, a railroad track switch, a mixer, a valve, a flow control device, a detonator, a weapon system fire control, a Power Source, a Command Switch, an Intent Signal Link, a Trajectory Stronglink, a Fireset, and a Detonator Strong Link. The use controlled component (UCC) may further be selected from a group of components consisting of: an Input Use Controlled Component (I-UCC), and an Output Use Controlled Component (O-UCC).

The integrated use control system above may further comprise: a. an Initialization Unit (IU) detachably in data communication with the IUC Chip; b. whereby the IUC Chip is initialized by the IU while in data communication with the IU.

The IUC Chip may be initialized by the IU using a programming executable on the IU executing steps comprising: detecting, on a detector, a random physical process; transmitting a periodic output of counts from the detector sensing the random physical process to the IU; selecting n bits from a series of the periodic output of counts to fill a large buffer on the IU with a sequence of random bits; and selecting a portion of the large buffer to form one or more IU very large random numbers (VLRNs) setting an IU Identification (ID) Number from one of the IU VLRNs; transmitting the IU Identification (ID) Number to the IUC Chip; and transmitting the large buffer from the IU to the IUC Chip.

The selecting n bits from a series of the periodic output of counts may simply relate to the least significant bits, some selection of bits that are not the least significant bits, or some other random or fixed bit pattern that is used for selection.

The detector may in some implementations be a Geiger counter detecting alpha, beta, gamma, or neutron radiations. Alternatively, the detector may be capable of detecting a random physical process such as radioactive decay, shot noise, thermal noise, radiofrequency fluctuation, or photon noise. The counts of the detector may comprise an actual count of detected events, or may comprise a count of a time based generator between such detected events (such as time between individual photon detections based on a digital counter).

The IUC Chip programming executable may be stored on a computer readable medium.

The IUC Chip may complete initialization by using a programming executable on the IUC Chip executing steps comprising: selecting a portion of the large buffer transmitted from the IU to the IUC Chip to form one or more IUC Chip very large random numbers (VLRNs); setting an IUC Chip Identification (ID) Number from one of the IUC Chip VLRNs; and transmitting IUC Chip ID Number to the IU.

The IUC Chip may complete IUC system initialization by using a programming executable on the IUC Chip executing steps comprising: selecting a UCC Chip Identification (ID) Number from one of the IUC Chip VLRNs for each of the UCCs; transmitting each selected UCC Chip ID Number to a corresponding UCC; and transmitting the IUC Chip ID Number to each of the UCCs.

The IUC Chip may complete IUC system initialization by using a programming executable on the IUC Chip executing steps comprising: selecting from the UCCs a group of Input UCCs (I-UCCs) and a group of Output UCCs (O-UCCs); selecting a Status-Condition Number from one of the IUC Chip VLRNs for each of the group of I-UCCs; transmitting each selected Status-Condition Number from the IUC Chip to a corresponding I-UCC; selecting a Control-Enable Number from one of the IUC Chip VLRNs for each of the group of O-UCCs; and transmitting each selected Control-Enable Number from the IUC Chip to a corresponding O-UCC.

In another aspect of the invention, an Intrinsic Use Control System operational validation method may comprise: providing an Intrinsic Use Control (IUC) Chip with an IUC Chip Identification (ID) Number; providing one or more Use Controlled Components (UCCs), each having a UCC Identification (ID) Number, and an enabled intended function; storing on the IUC Chip each UCC ID Number; storing on each UCC the IUC Chip ID Number; and periodically polling, by a program executable on the IUC Chip, each of the UCCs to confirm that: each UCC ID Number corresponds to the UCC ID Number stored on the IUC Chip; and the IUC Chip ID Number transmitted from the IUC Chip corresponds to the IUC Chip ID Number stored on each UCC.

The IUC Chip program executable may be stored on a computer readable medium.

The Intrinsic Use Control System operational validation method may further comprise: if any polling result is unsuccessful, then transmitting from the IUC Chip to all UCCs a command disabling the UCC from its intended function.

In still another aspect of the invention, a method of generating very large random numbers may comprise: providing a Geiger counter output of periodic counts from a detector sensing radioactive decay from a radioactive source; forming an array where each element of the array is one of the periodic counts; concatenating n least significant bits from m successive array elements to form a sequence of random bits in a large buffer; and selecting a portion of sequence of random bits within the large buffer to form one or more very large random numbers (VLRNs).

In the method of generating very large random numbers above, the very large random numbers (VLRNs) may be large in a digital encryption sense, and therefore have odds of guessing a given VLRN less than a billion to one. Alternatively, the very large random numbers (VLRNs) may be greater than or equal to 30 bits in length.

In yet another aspect of the invention, a method of integrated use control may comprise: providing an Intrinsic Use Control (IUC) Chip; providing one or more use controlled components (UCCs), each with communication available to the IUC Chip, and each with an intended function; initializing the one or more of the UCCs with the IUC Chip; periodically polling at least one of the UCCs by the IUC Chip, each polling resulting in either: a successful bidirectional identification of the polled UCC to the IUC Chip; or an unsuccessful bidirectional identification of the polled UCC to the IUC Chip; and upon the polling result being unsuccessful, discontinuing the operation of the UCC with the unsuccessful polling result.

The method of integrated use control above may further comprise: if the unsuccessful bidirectional identification results, then rendering inoperable the intended function of all UCCs in communication with the IUC Chip.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Definitions

Figure 1:
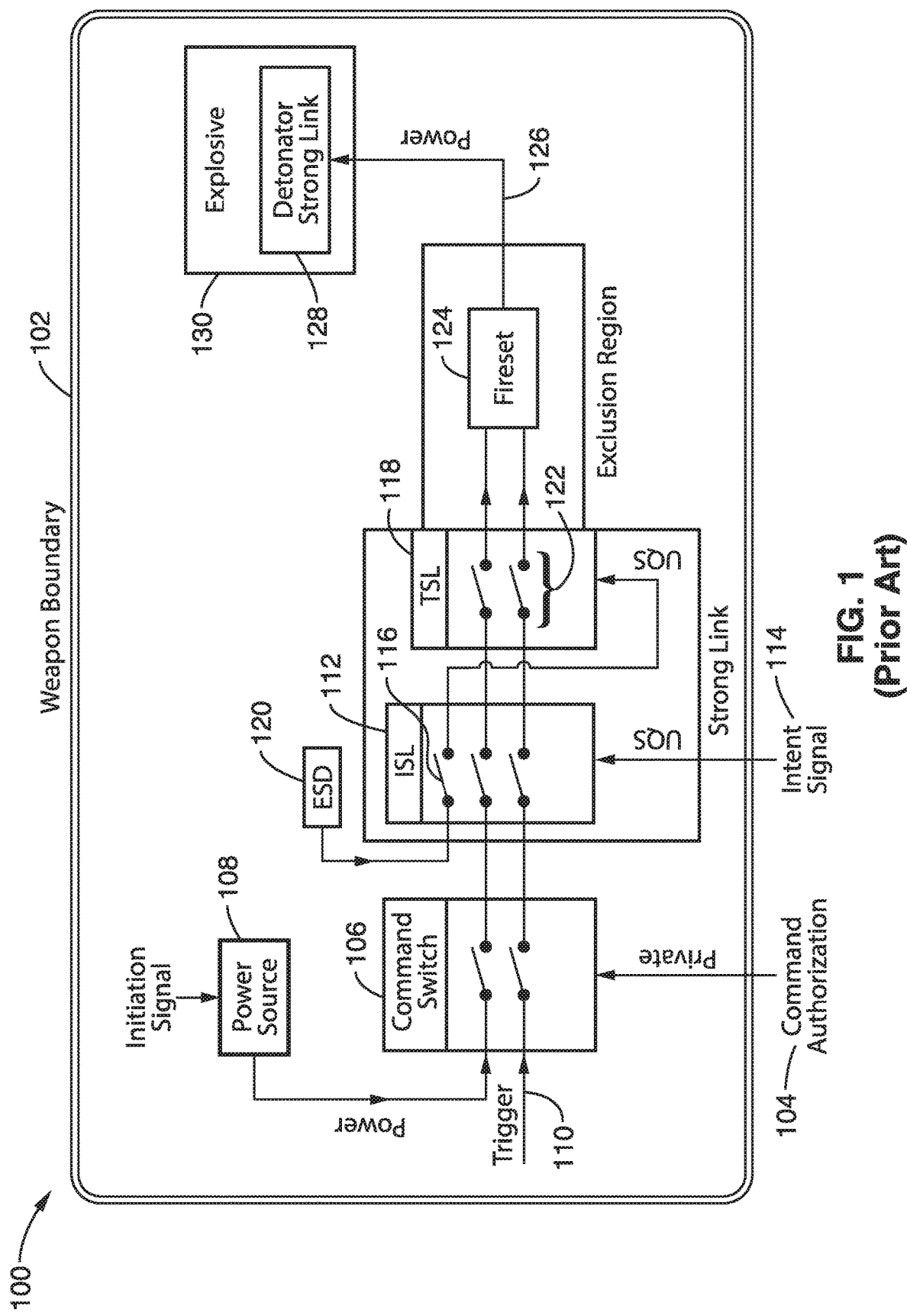
FIG. 1 is a simplified schematic diagram of a prior art weapon showing a simplified arming, firing, and initiation circuit placed within the boundary of the weapon.

The following terms are used herein and are thus defined to assist in understanding the description of the invention(s). Those having skill in the art will understand that these terms are not immutably defined and that the terms should be interpreted using not only the following definitions but variations thereof as appropriate within the context of the invention(s).

Use Controlled Component (UCC) means a component capable of accepting an input and delivering an output. Such UCC will comprise a use control chip, and can become a protected component in an Intrinsic Use Control system architecture after proper initialization.

Input and output UCCs are distinctly different in their function within the secured system. Input devices (e.g., sensors) generate data, a condition or signal that moves to a central processor. To ensure that such signal is valid data from the sensor initialized in the secured system, the data is accompanied by a Status-Condition Number (a VLRN) as part of the message that is then verified by the IUC Chip in the central processor. An output device receives a Control-Enable Number (a VLRN) at initialization that when verified as authentic permits the output device to perform its intended function.

Input UCC (I-UCC) means a use controlled capable component able to receive an input.

Output UCC (O-UCC) means a use controlled capable component able to generate an output.

Input Output UCC (IO-UCC) means a use controlled capable component able to receive an input and able to generate an output. Such component may be represented as an Input UCC and a separate Output UCC.

Use control Integrated Circuit (IC) means an integrated circuit in a UCC that provides protection against unauthorized use of the component. The use control chip is typically implemented as some form of a state logic processor, either in Field Programmable Gate Array (FPGA) logic, Application Specific Integrated Circuit (ASIC), or in microprocessor form having, without limitation, input and output communication ports, volatile and non-volatile memory, flags, and registers.

Reset means a condition of the use control chip after being dissevered wherein the use control chip memory has been cleared, and registers and flags cleared. In the reset condition, a UCC becomes inoperative.

Initialized means a condition of a UCC following logical linking of its use control chip to the Intrinsic Use Control (IUC) Chip Inoperative means condition of the UCC during which it will not operate. Nonlimiting inoperative examples of such conditions include:

(1) after UCC manufacture and prior to UCC initialization; and (2) after the UCC initialization, but disconnected from the apparatus in which it was initialized.

Operative means the condition of the UCC following initialization and connection to the system where it was initialized.

Linked means a condition of a UCC following logical linking of its use control chip to the Intrinsic Use Control Chip.

Dissevered means a logical condition set within the Intrinsic Use Control system in the weapon following system reset.

Random Number means a very large random number (VLRN) of defined length that meets system design requirements for probability of denial of unauthorized use (e.g., greater than 1 billion in value). Such VLRNs are used in assigning Identification Numbers to use controlled components (UCCs), for Status-Condition Numbers, and for Control-Enable Numbers. These VLRNs may be pseudorandom numbers, or true random numbers generated from known random physical processes.

Status-Condition Number means a VLRN sent by a UCC to the Intrinsic Use Control (IUC) Chip indicating that an input has been provided to the UCC that has resulted in a change of its status (e.g. Command Switch (CS) unlocked). Such a VLRN is created and assigned by the IUC Chip to the UCC. Subsequently, the same VLRN stored in the IUC Chip is used to compare with the Status-Condition Number sent by the I-UCC for authentication.

Control-Enable Number means a VLRN created and sent by the IUC Chip to an output UCC to enable a function in the UCC (e.g. charging of the fireset). Such a VLRN is created and assigned by the IUC Chip to a UCC. Subsequently, the VLRN stored in the O-UCC is used to compare with the Control-Enable Number sent by the IUC Chip for authentication.

Identification (ID) Number means a VLRN assigned by the IUC Chip to a UCC. Such a VLRN is created and assigned by the IUC Chip to a UCC. In some embodiments, the IUC Chip may create an IU ID Number. This VLRN is used in continual periodic exchanges between UCCs and the IUC Chip for comparison and verification as a requirement for continued system operation.

Manufacturing Tester means hardware containing logic comparable to an IUC Chip that logically links to a UCC to function and test that component. Such hardware would be able to link, test, and dissever one or more UCC as a device under test.

Surveillance Tester means hardware containing logic comparable to an IUC Chip that logically links to a UCC to function and test that component. Such hardware would be able to link, test, and dissever one or more UCC taken out of service for test and verification of operation to specification.

Computer means any device capable of performing the steps, methods, or producing signals as described herein, including but not limited to: a microprocessor, a microcontroller, a digital state machine, a field programmable gate array (FPGA), a digital signal processor, a collocated integrated memory system with microprocessor and analog or digital output device, a distributed memory system with microprocessor and analog or digital output device connected by digital or analog signal protocols.

Computer readable medium means any source of organized information that may be processed by a computer to perform the steps described herein to result in, store, or perform logical operations upon, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FPGAs), and flash random access memory (flash RAM).

Overview

This invention addresses methods and apparatus for implementing positive measures in weapons that will deny an unintended use of a weapon from arming, firing, and initiation weapons components during attempts at unauthorized detonation.

These positive measures may be accomplished through the use of Intrinsic Use Control (IUC) weaponization, where components protect themselves from unauthorized use by virtue of the way they are functionally designed. An IUC class weapon is designed to reliably function as intended, when intended, exclusively as desired under authorization of a National Command Authority.

Simultaneously, the IUC class weapon will defeat attempts by the very people who designed and built the arming, firing, and initiation components to cause such components to function. Therefore, even weapon designers, who are extremely well versed in the implementation and design details of a particular weapon, would be unable to cause the weapon to function. Such weapon may be chemical, or non-chemical in nature.

Basic Sequence Required for Detonation of a Weapon

Refer now to FIG. 1, which is a simplified schematic diagram of a prior art weapon 100 showing a simplified arming, firing, and initiation circuit placed within the boundary 102 of the weapon.

National Command Authority authorizes weapon use by passing an encrypted Command Authorization 104 code to the Command Switch 106.

The Command Switch 106 then decodes the input code value and compares it with a previously stored value. If the two values agree, then the Command Switch 106 is unlocked, and switches are closed connecting the power from the Power Source 108 and trigger 110 lines to the Intent Stronglink (ISL) 112.

The Intent, Unique Signal (UQS) 114 is entered to close the Intent Stronglink (ISL) 112.

The Intent Stronglink (ISL) 112 switch 116 is closed delivering power to the Trajectory Stronglink (TSL) 118.

The weapon 100 is dropped out of a bomb bay and spin rockets fire, producing a rotation sensed with the Environmental Sensing Device (ESD) 120 detecting the g-loading, indicating an irrevocable delivery on target condition.

The Trajectory Stronglink (TSL) 118 switches 122 are closed, delivering power 108 to the Fireset 124 and connecting the trigger 110 line to the Fireset 124.

The Fireset 124 charges to a preset nominal voltage and the weapon 100 is thereby armed.

A fuse (not shown here) reaches its preset condition for firing and sends the trigger 110 signal.

The Fireset 124 discharges, delivering required power 126 and action to the Detonator Strong Link 128 in the explosive package 130 resulting in device operation and subsequent detonation.

Intrinsic Use Control

Figure 2:
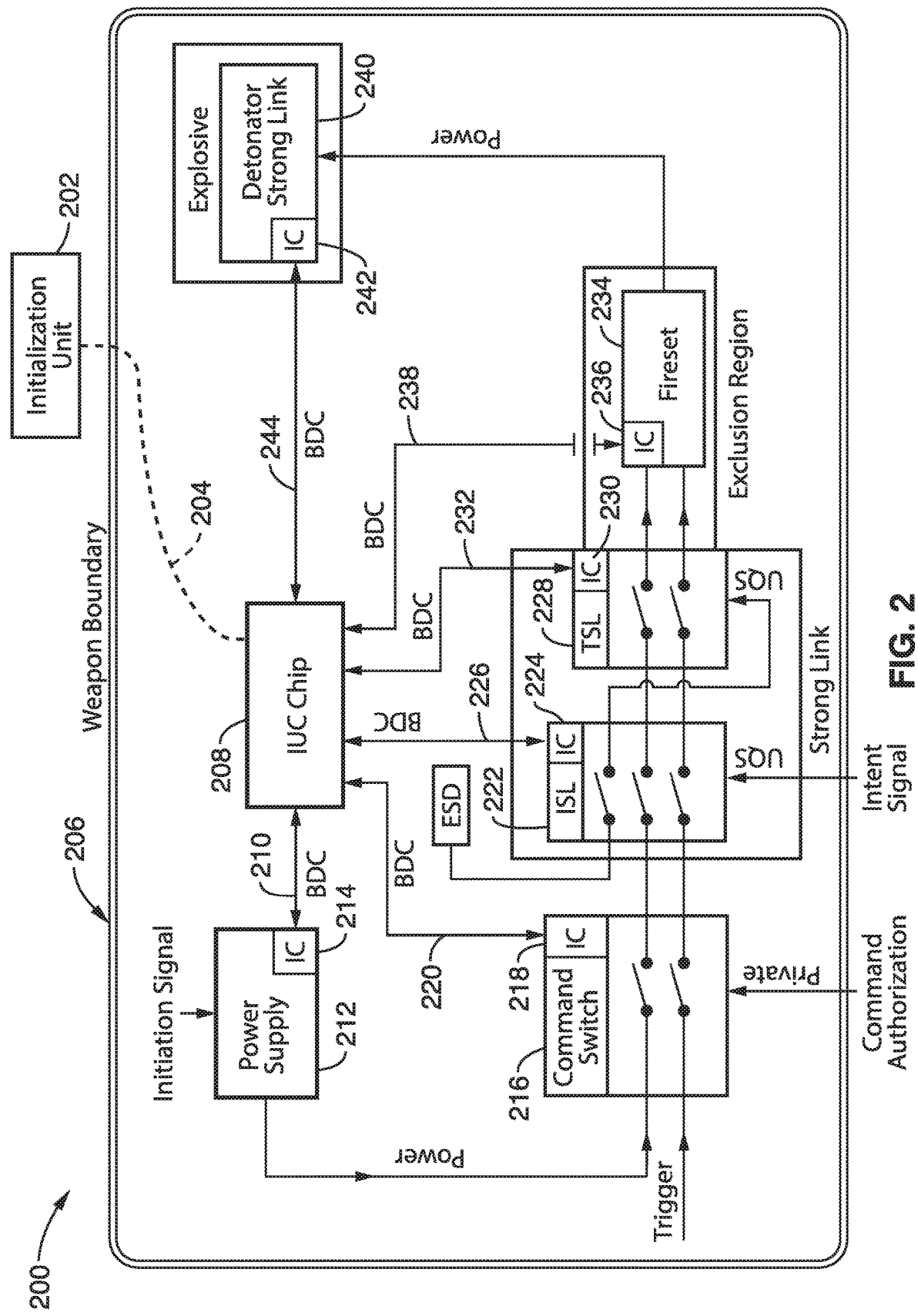
FIG. 2 is a simplified schematic showing use controlled architecture whereby Intrinsic Use Control (IUC) Chip (i.e. a logic circuit) has been added, and have been integrated into certain existing weapon functional elements to create Use Controlled Components (UCCs) within the weapon.

FIG. 2 is a simplified schematic 200 showing use controlled architecture whereby Intrinsic Use Control logic circuits have been integrated into certain existing weapon components from FIG. 1.

An Initialization Unit 202 is temporarily connected 204 to the weapon 206 and the Intrinsic Use Control (IUC) 208 Chip during initialization or dissever operations at an assembly location. The Initialization Unit 202 is generally considered resident at the assembly location.

Refer now to both FIGS. 1 and 2. In FIG. 2, the IUC 208 Chip has been logically connected via a Bi-directional Digital Communications (BDC) link 210 with one or more Use Controlled Components (UCCs) in the weapon 206. For example, the Power Source 212 of FIG. 2 has been redesigned to perform the functions discussed in the Power Source 108 of FIG. 1, but now will function only with the approval of a use controlled Integrated Circuit (IC) 214. Such an implementation may include placing power regulation circuitry on the use controlled IC 214, where, without proper approval by the use controlled IC 214, the Power Source 212 will simply not function.

Similarly, the Command Switch 216 of FIG. 2 performs the same functions as the Command Switch 106 of FIG. 1, however as an I-UCC, when the Command Switch 216 receives on its use controlled Integrated Circuit (IC) 218 an authenticated input through the logically connected Bi-directional Digital Communications (BDC) link 220, the Command Switch 216 conveys its unlock status to the IUC Chip 208 as an authenticated message containing data and the Command Switch 216 Status-Condition Number previously assigned for comparison with the Status-Condition Number held in the IUC Chip 208 memory for verification of authenticity. Only when the Command Switch 216 transmitted Status-Condition Number matches the Command Switch 216 Status-Condition Number stored on the IUC Chip 208 does the IUC Chip 208 recognize that the Command Switch 216 is unlocked.

It should be parenthetically noted that in some embodiments of the invention, the Intrinsic Use Control (IUC) 208 Chip, upon receipt of a signal from a use controlled component that has ceased to function, would cascade a cease-to-function signal to all other use control IC's present in the device. Thus, any detected tampering of use control IC's would cause the entire device, and all use controlled components, to cease to function. Removal of any components to another device would simply cascade the cease to function signal to all use controlled components in the new device.

Similarly, Intent Strong Link (ISL) 222 would also have a use control IC 224 built into it, which would grant permission to operate through proper communication with the BDC 226 to the IUC Chip 208. The ISL 222 is one example of an I-UCC.

The Trajectory Strong Link (TSL) 228 would also have a use control IC 230 built into it with communications available through the BDC 232 to the IUC Chip 208. The TSL 228 is another example of an I-UCC.

The Fireset 234 would also have a use control IC 236 built into it with communications available through the BDC 238 to the IUC Chip 208. The Fireset 234 is one example of an O-UCC.

Finally, the Detonator Strong Link (DTS) 240 would also have integrated into it a use control IC 242, with communications available through the BDC 244 to the IUC 208. When the Detonator Strong Link (DTS) 240 receives a Control-Enable Number from the IUC 208 permitting it to arm, e.g., mechanically rotate wheel holding initiation pellet until the pellet is physically in line with the initiation train in the detonator thereby arming the detonator, or if the detonator contains a miniature fireset, (as opposed to having an external fireset connected with an electrical cable) allowing the fireset to charge up and arm the detonator. The Detonator Strong Link (DTS) 240 is another example of an O-UCC.

Each of the functional elements in the weapon 206 that contain integrated use IC chips, i.e. the Power Source 212, the Command Switch 216, the Intent Signal Link 222, the Trajectory Stronglink 228, the Fireset 234, and the Detonator Strong Link 240 would be designed in such a way that removal or unapproved operation of the use control IC chips (respectively 214, 218, 224, 230, 236, and 242) would render the functional element useless and functionally inert.

DISCUSSION

FIGS. 3A-3H form a sequence of diagrams relating to intrinsic use control in a system with diverse components for system and component security.

Figure 3A:
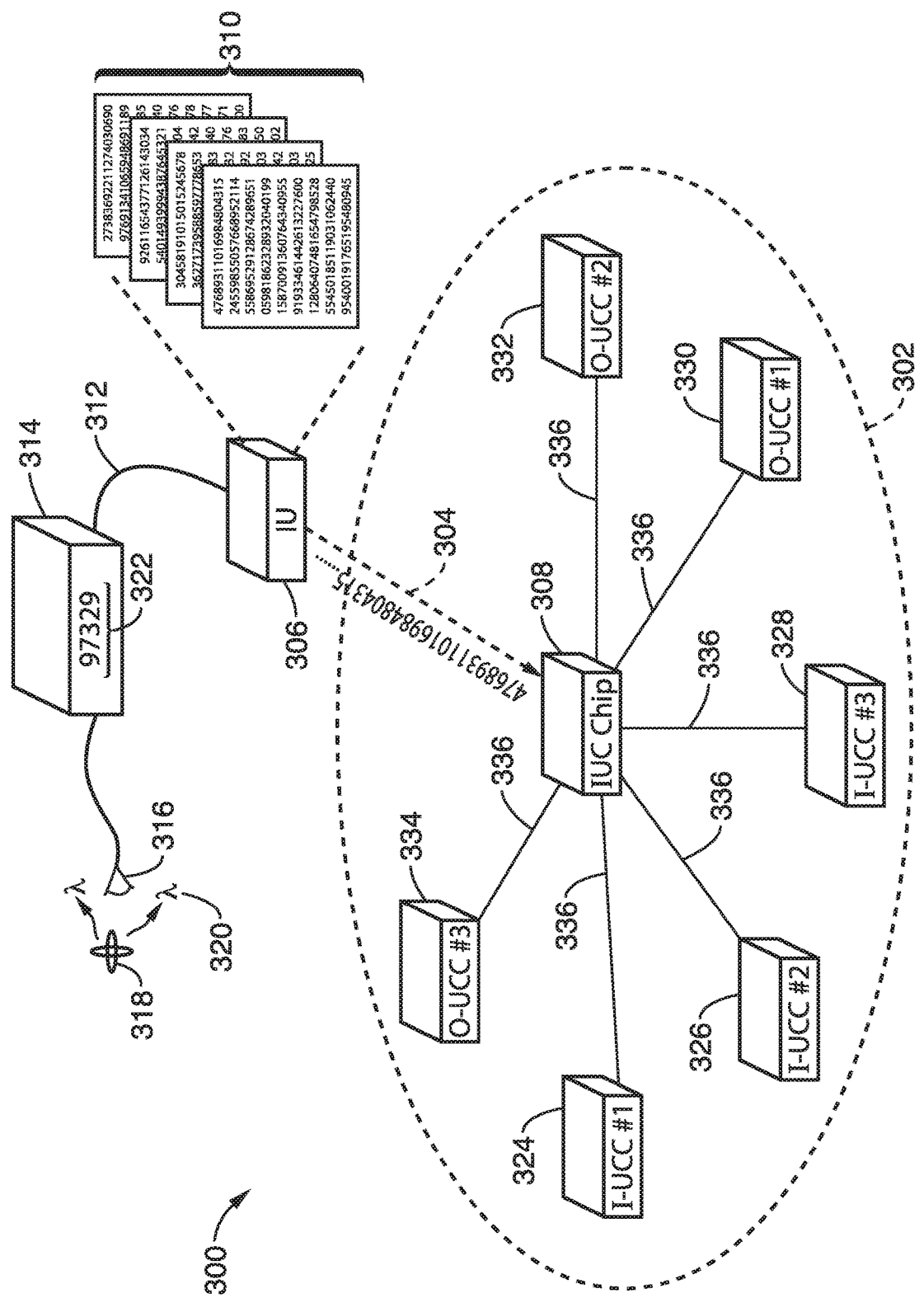
FIG. 3A is a diagram of an Intrinsic Use Control (IUC) System ready for initialization.

Refer now to FIG. 3A, which is a schematic 300 for a typical Intrinsic Use Control (IUC) System 302. Nonlimiting examples of such IUC Systems 302 include security systems, fly-by-wire avionics systems, chemical processing plants, transportation systems, command and control systems, and weapons systems.

The initialization process begins with the bidirectional data connection 304 of the Initialization Unit (IU) 306 to the IUC Chip 308. The IU 306 and IUC System 302 are powered up.

The IU 306 uses a random physical process such as radioactive decay emission counting to generate a large buffer 310 of very large random numbers that remains known only to the IU 306.

One embodiment uses an electrically connected 312 Geiger counter 314 that uses detector 316 to radiation source 318 emissions 320. Such emissions 320 are counted by the Geiger counter 314 to form a count 322.

By using successive counts 322 random numbers may be generated. Higher placed bits that correlate with radiation field intensity would be discarded, while rapidly changing lower placed bits would be concatenated to compile the large buffer 310 of very large random numbers.

It should be noted that natural background ionizing radiation fields are of sufficient intensity to generate random numbers when using a sufficiently sensitive detector 316, such as a sodium iodide crystal. Once the IU 306 large buffer 310 of very large random numbers is full, the large buffer 310 is checked to confirm a sufficient randomness using traditional statistical techniques. Once sufficient randomness of the large buffer 310 has been verified, the large buffer 310 of very large random numbers is transmitted from the IU 306 to the IUC Chip 308 over the bidirectional data connection 304, and the large buffer 310 of very large random numbers is stored in the IUC Chip 308 memory.

In this representative Intrinsic Use Control (IUC) System 302, there are also input and output Use Controlled Components (UCCs), respectively labeled I-UCC #1 324, I-UCC #2 326, I-UCC #3 328, O-UCC #1 330, O-UCC #2 332, O-UCC #3 334, each of which are electrically connected to the IUC Chip 308 through a bidirectional data connection 336. It should be noted here that the bidirectional data connection 336 is indicated as a star-type network, but may also be implemented as a ring, parallel, or combination of the foregoing network topology so long as data connection between the UCC and the IUC Chip 308 is achieved.

Initialization

Figure 3B:
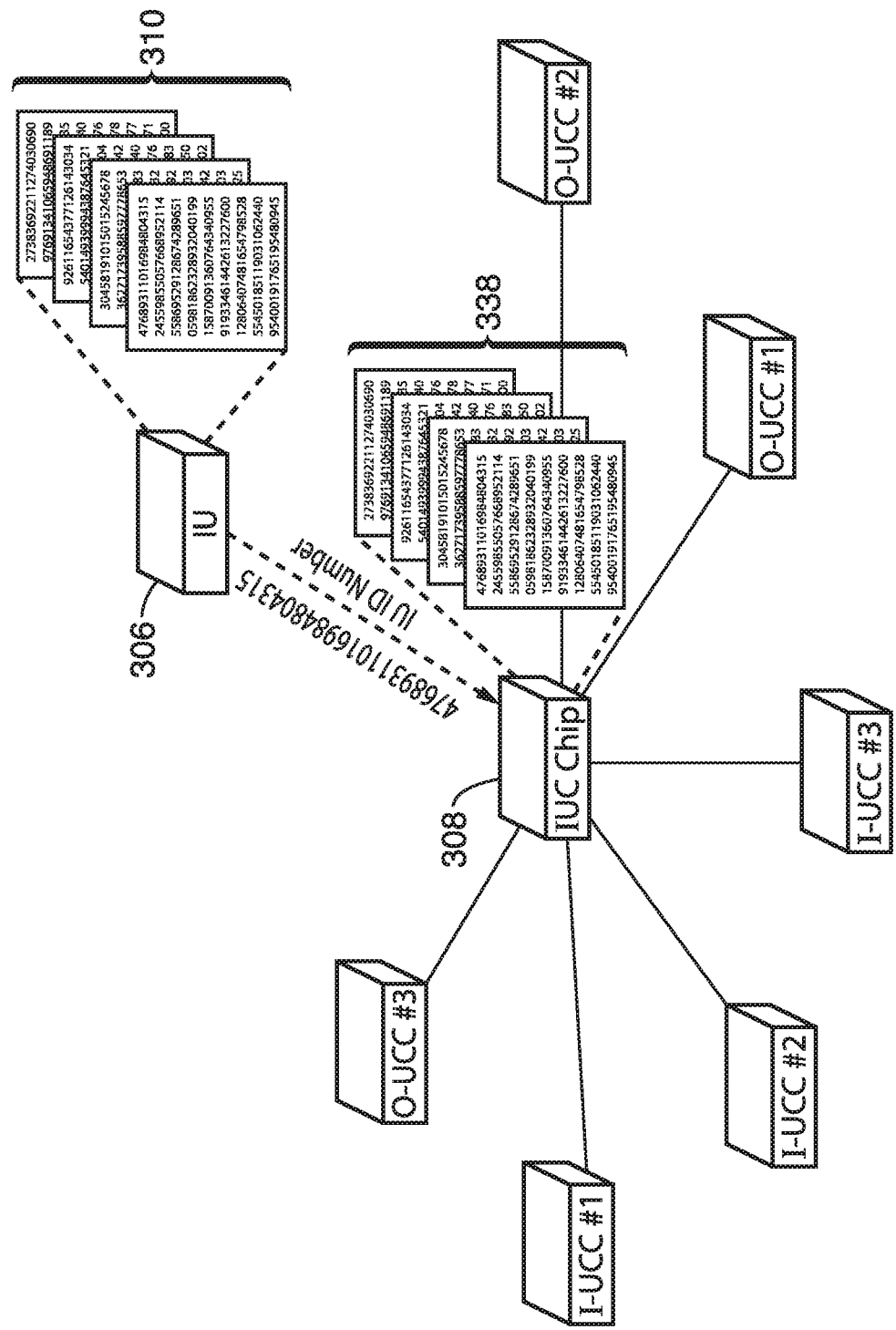
FIG. 3B is a diagram of the Intrinsic Use Control (IUC) System of FIG. 3A where: 1) a large buffer of random numbers has been sent from an Initialization Unit (IU) to an Intrinsic Use Control (IUC) Chip, and 2) an IU Identification (ID) Number has been selected from the large buffer by the IU and also transmitted to the IUC Chip.

Refer now to FIG. 3B. Here, the IUC Chip 308 receives the large buffer 310 from the IU 306, which is stored in its memory 338. The IUC Chip 308 then typically retransmits the memory 338 contents back to the IU 306 for verification of error-free transmission. For clarity, here the numbers are sent in clear text, although many different types of encryption may additionally be used.

Additionally, the IU 306 selects a portion of the large buffer 310 to act as the IU 306 Identification (ID) Number, which is also transmitted to the IUC Chip 308 where it is also stored.

Figure 3C:
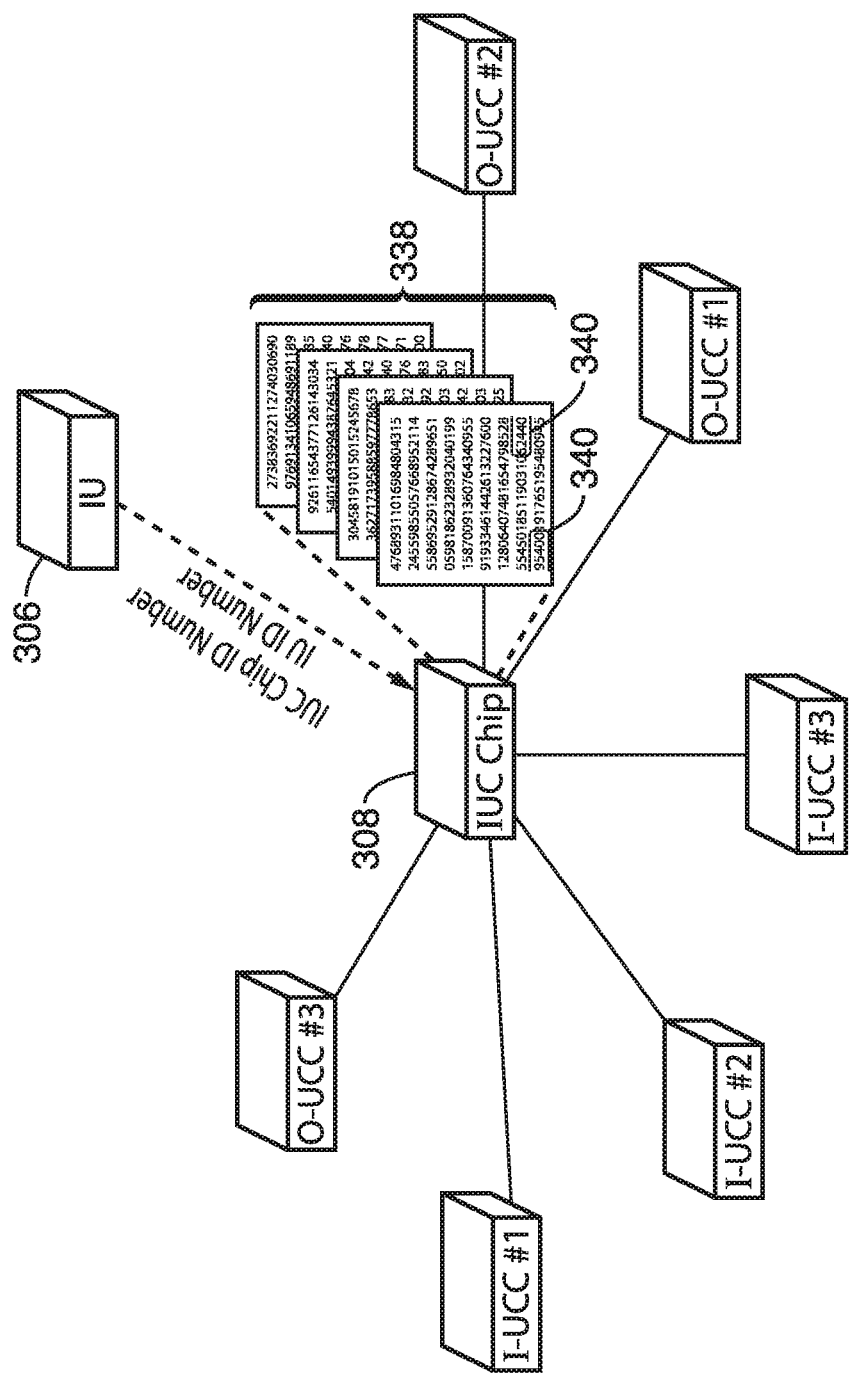
FIG. 3C is a diagram of the Intrinsic Use Control (IUC) System of FIG. 3B where: 1) the large buffer of random numbers sent from the Initialization Unit (IU) has been stored within the Intrinsic Use Control (IUC) Chip, and 2) an IUC Chip Identification (ID) Number has been selected from the stored large buffer by the IUC Chip and also transmitted to the IU.

Refer now to FIG. 3C. The IUC Chip 308 continues its initialization process by selecting a portion 340 of the large buffer 338 for its IUC ID Number (a very large random number, or VRLN), which is sent to the IU 306. In this non-limiting example, the portion 340 consisting of digits "62440954001" has been selected. These Identification Numbers are stored in the IUC Chip 308 memory and transmitted from the IUC Chip 308 to the IU 306 for storage in its memory.

For security purposes, the IU 306 and IUC Chip 308 have now taken on a parent-child relationship where the IUC Chip 308 (acting as the child) will only talk to its IU 306 (acting as the parent) and the IU 306 will only communicate with the IUC Chip 308 it has initialized.

Figure 3D:
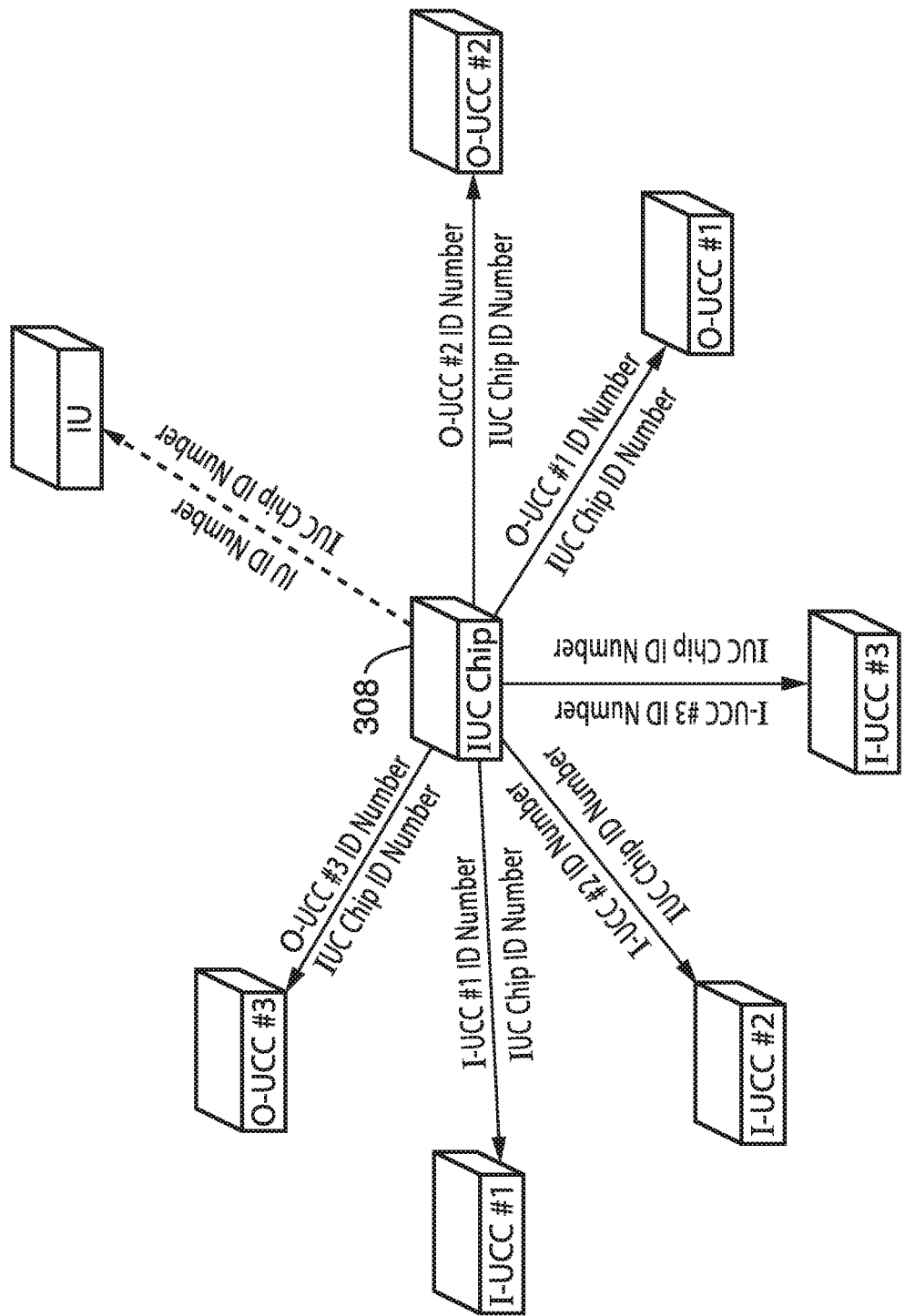
FIG. 3D is a diagram of the Intrinsic Use Control (IUC) System of FIG. 3C where: 1) portions of the stored large buffer of random numbers have been selected to generate very large random numbers (VLRNs), 2) a VLRN UCC Identification (ID) Number has been transmitted from the IUC Chip to each Use Controlled Component (UCC), and 3) the IUC Chip ID Number.

Refer now to FIG. 3D. The IUC Chip 308 continues to select portions of the large buffer 338 (not shown here for clarity) to create more VLRN Identification Numbers for the various attached input and output Use Controlled Components (UCCs) and stores these generated Identification Numbers in its memory. To each attached UCC, the IUC Chip 308 transmits both its IUC Chip ID Number, and the unique VLRN UCC identification (ID Number), where the respective UCC stores the information in its UCC memory.

Figure 3E:
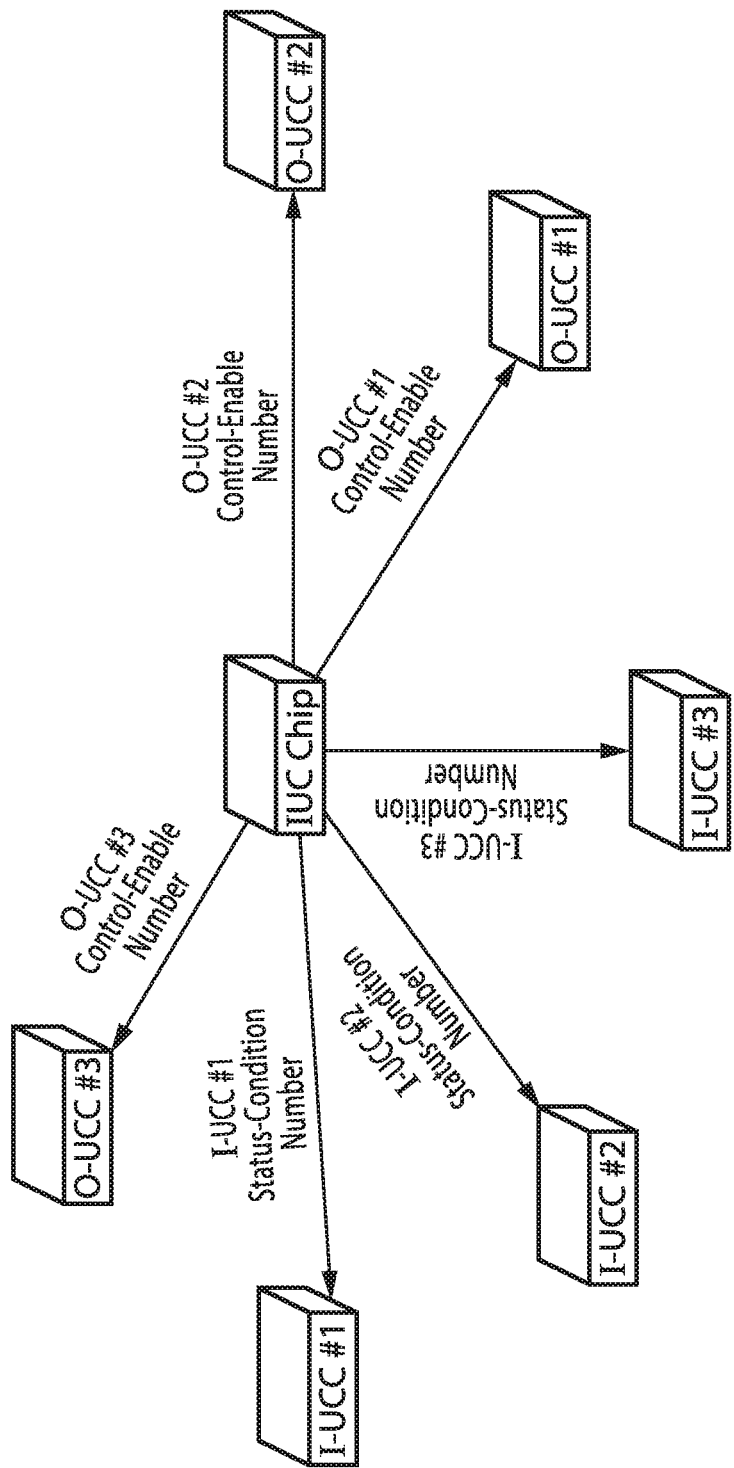
FIG. 3E is a diagram of the Intrinsic Use Control (IUC) System of FIG. 3D where generated very large random numbers (VLRNs) have been sent from the IUC Chip to each Use Controlled Component (UCC) to act as Status-Condition Numbers in the case of Input UCCs (I-UCCs), and Control-Enable Numbers in the case of Output UCCs (O-UCCs).

Refer now to FIG. 3E. The IUC Chip 308 continues to select portions of the large buffer 338 (shown previously in FIG. 3B) to create VLRN Status-Condition and Control-Enable Numbers and stores these Numbers in its memory while the unique VLRN UCC Status-Condition or Control-Enable Numbers are transmitted out to the UCCs where they are stored in respective UCC memory.

Although not shown here, the IUC Chip 308 then executes a system check of itself and all attached UCCs using firmware logic and reports to the IU 306 that the IUC System 302 (shown in FIG. 3A) is fully functional. The IU 306 is then disconnected from the IUC System 302.

The IU 306 then clears its memory contents in the large buffer 310 (shown previously in FIG. 3A) as part of the IU 306 power down process. In one embodiment, this clearing process is inherent, as the large buffer 310 is stored in volatile random access memory. In another embodiment, the clearing process may utilize multiple write cycles of ones and zeros to clear the memory space previously occupied by the large buffer 310.

Operation

Figure 3F:
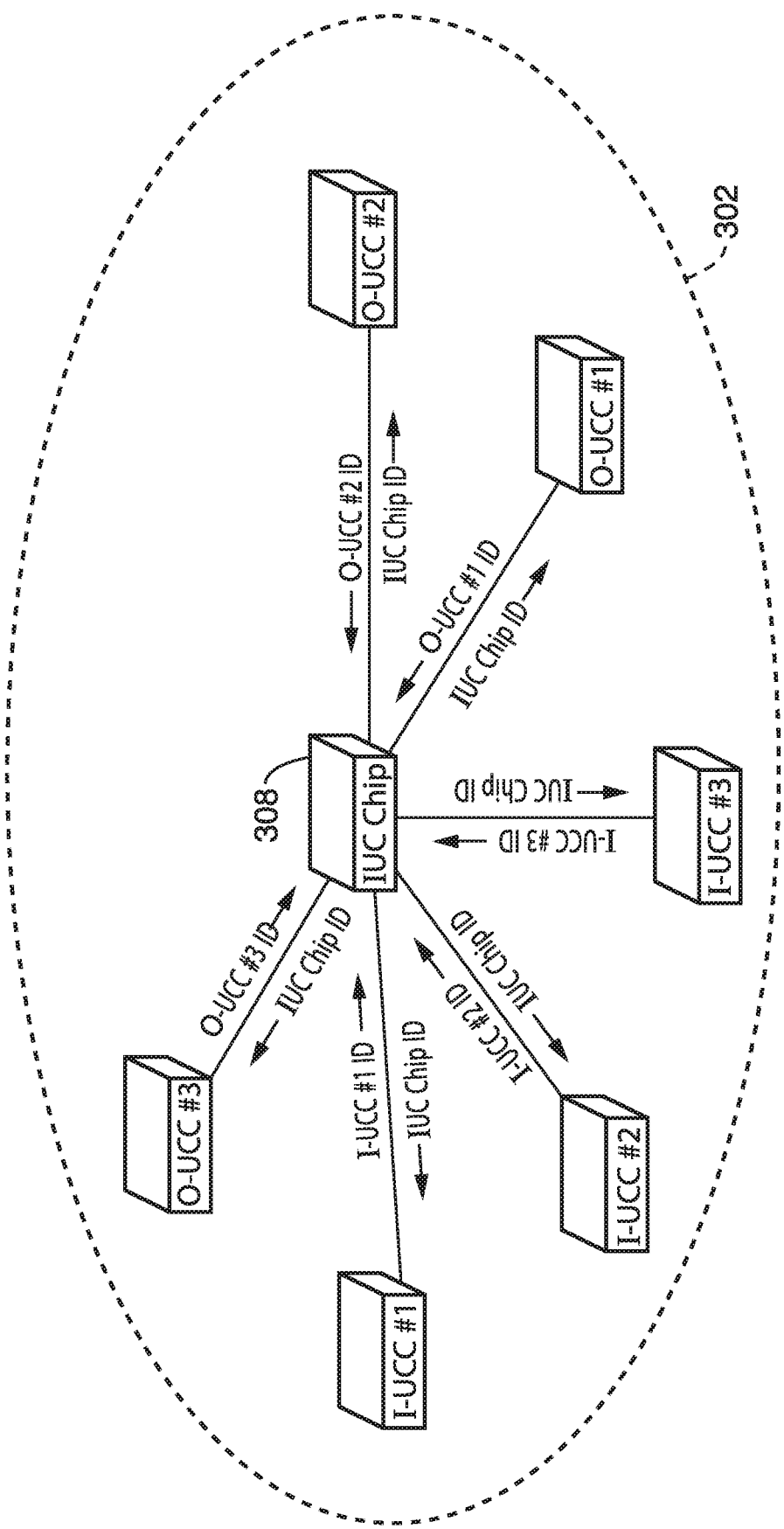
FIG. 3F is a diagram of the Intrinsic Use Control (IUC) System of FIG. 3E where polling is being used to validate the operational status and integrity of all connected Use Controlled Components (UCCs).

Refer now to FIG. 3F, where the IU 306 previous present in FIG. 3A through FIG. 3D has been removed from the IUC System 302.

Following initialization previously described in FIG. 3A through FIG. 3D, operation begins with IUC System 302 power-up and mutual verification of component Identification Numbers on a frequent (days, weeks, months, minutes, seconds, or milliseconds) basis.

Verification is achieved when the IUC Chip 308 queries an attached UCC by sending its IUC Chip Identification. The attached UCC must then supply the IUC Chip 308 with its previously supplied UCC ID Number.

If the IUC Chip 308 receives a number that fails to match its internally stored ID Number for a specific UCC, then there is failure to verify identification.

When there is a failure to verify, there may be a mitigating response by the IUC System 302. Such mitigating response may include rendering all connected UCCs, and the IUC Chip 308 to a tampered state, whereby no further function may be obtained by either the IUC Chip 308 or any individual UCC.

In this way, the IUC System 302 can detect and respond to unauthorized successful or failed attempts to replace or cause to function UCCs with mitigating actions. Such mitigating actions may also include passive announcements, safe shutdown, temporary IUC System 302 or individual UCC disablement, or permanent IUC System 302 or individual UCC disablement.

In the case where the IUC System 302 is a weapon, the IUC System 302 shuts down permanently, and within the polling interval of the IUC Chip 308, which may be only milliseconds in duration.

Such shut down would not be the case for an IUC System 302 chemical plant, where a safe shutdown may be required to reduce chances for spillage or explosion. For an avionics IUC System 302, an announcement at startup may be made that tampering has been detected, or simply the engines may be prevented from starting. For an IUC System 302 in a submarine weapon system, other specialized combination responses might include startup announcement, power killing, and messaging.

Figure 3G:
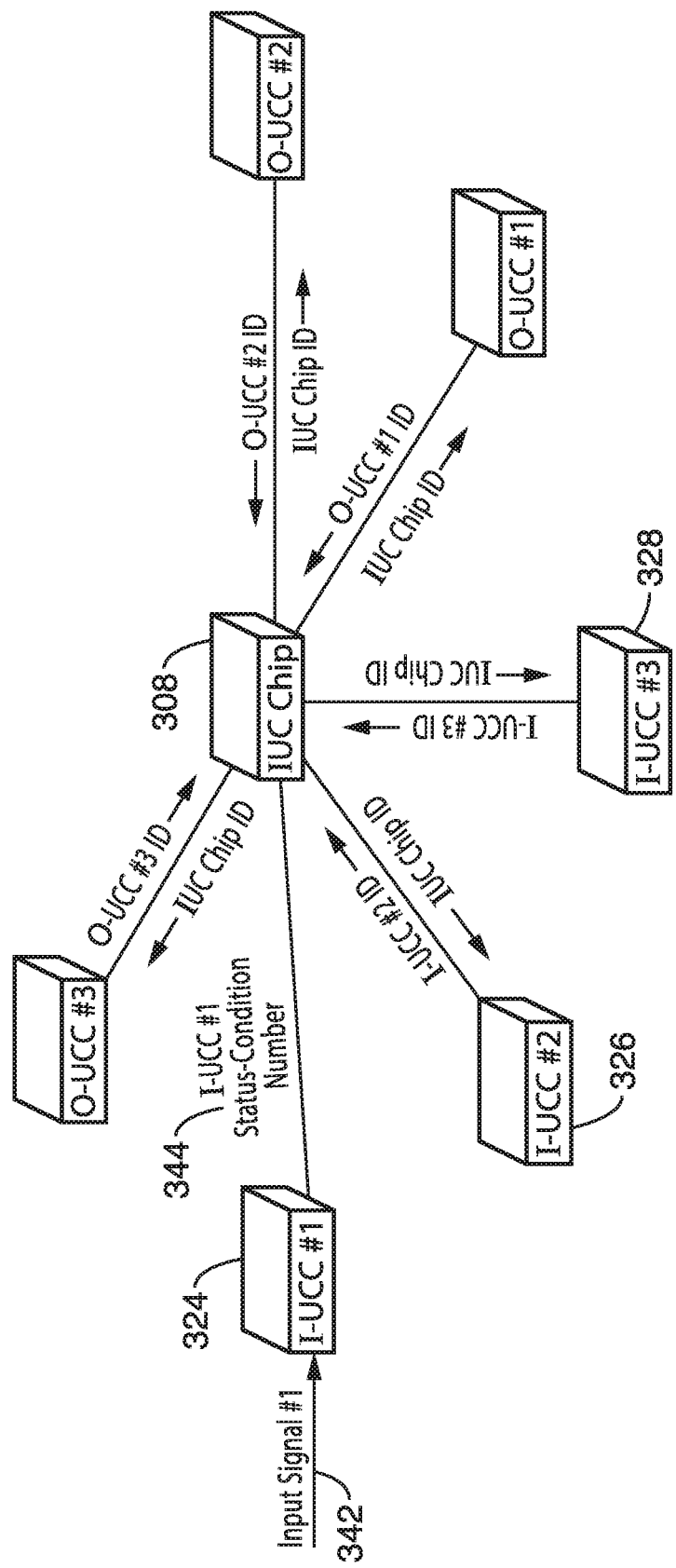
FIG. 3G is a diagram of the Intrinsic Use Control (IUC) System of FIG. 3F where an input has been received by I-UCC #1 and sent to the IUC Chip via a secured communication.

Refer now to FIG. 3G. Input use controlled component I-UCC #1 324 receives an Input Signal #1 342, and sends a unique VLRN Status-Condition Number 344 to the IUC Chip 308 as a certified message for comparison and verification by the IUC Chip 308. There is continuing concurrent mutual verification between the IUC Chip 308 and all other attached UCCs.

Similar operation may be obtained through operation of the other input UCCs, I-UCC #2 326, and I-UCC #3 328.

Figure 3H:
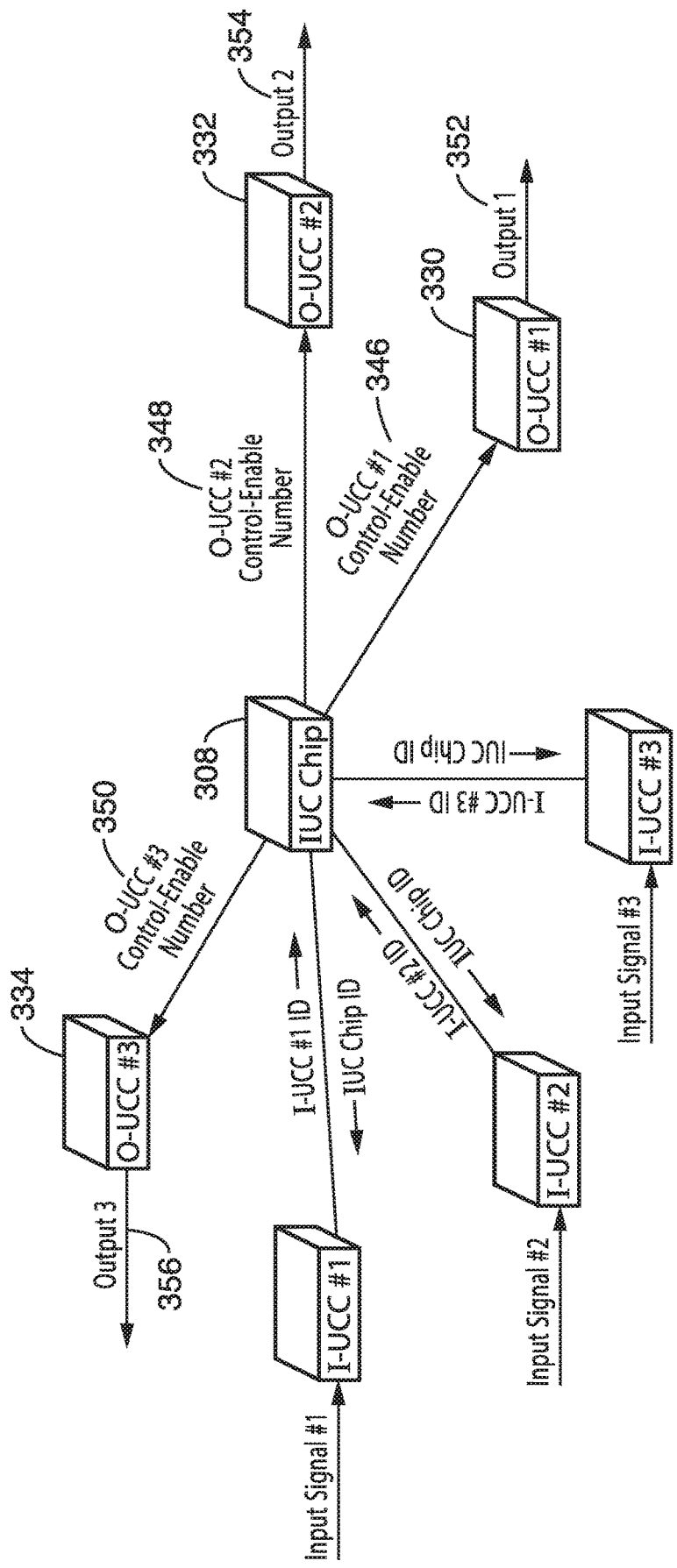
FIG. 3H is a diagram of the Intrinsic Use Control (IUC) System of FIG. 3F where an input has been received by each of the I-UCCs and outputs have been enabled by the IUC Chip to each of the O-UCCs.

Refer now to FIG. 3H, where all three input use controlled components have received their inputs in the correct sequence (for explanatory purposes here), and have sent their unique Status-Condition Numbers as part of a certified message to the IUC Chip 308 for comparison and verification. Then, VLRN unique Control-Enable Numbers 346, 348, and 350 are sent by the IUC Chip 308 to the appropriate respective output UCCs O-UCC #1 330, O-UCC #2 332, O-UCC #3 334, as part of a validated message for comparison and verification of authenticity. With UCC verification of the unique Control-Enable Numbers, the respective outputs 352, 354, and 356 are delivered.

Radiation Based Random Number Generation

Figure 4:
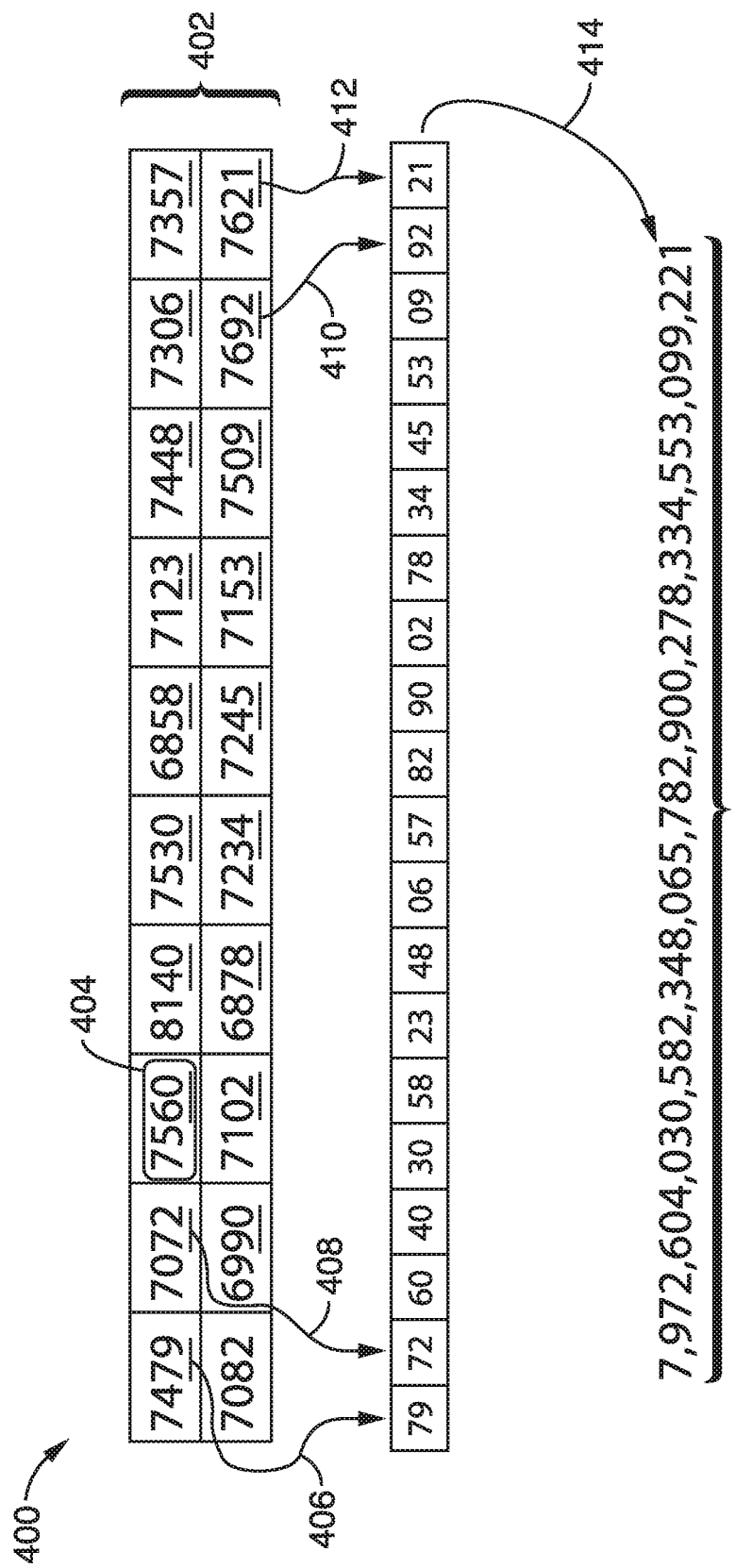
FIG. 4 is a representation of how very large random numbers may be generated by successive Geiger counter readings.

Refer now to FIG. 4, which indicates 400 how random numbers might be generated by use of a Geiger counter to detect ionizing photons and atomic particles from radioactive decay processes. In this example, twenty samples 402 of four digit decimal 404 counts are displayed. The underlined least significant two decimal places are used in this example. Each of these underlined two digit counts are 406, 408 . . . 410, 412 successively concatenated 414 into a single VLRN 416 of 7,972,604,030,582,348,065,782,900,278,344,553, 099,221. Such a VLRN 406 has odds of less than one chance in 10 thousand, billion, billion, billion, billion of being guessed. Even the United States National Security Agency (NSA) and all of its computers would be unlikely ever to be able to crack this random number generator.

Refer now back to FIG. 3A. The VLRN generation process is repeated by concatenating the binary values of the tens' and ones' place values from each count until the buffer has been filled with a string of random numbers sufficiently long to provide the necessary quantity of very large random numbers (VLRN) for use by the IUC System 302 in generating all Identification Numbers, Status-Condition Numbers, and Control-Enable Numbers.

The IU 306 operates in a constant natural background radiation field or is collocated with a manmade or natural radioactive source that is located in constant proximity to the IU's 306 integrated radiation detector 316.

System Diagnostics

The IUC system also permits connection of the IU to perform system diagnostics by commanding the IUC Chip to check connection integrity and verify all Identification Numbers, Status-Condition Numbers, and Control-Enable numbers and function of all UCC. The IUC Chip will identify faulty components for replacement or repair and report its findings to the IU. The IU will in turn report IUC system status to the operator.

Embodiments

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the invention can be embodied in various ways, including the following:

1. An integrated use control system, comprising: (a) an Intrinsic Use Control (IUC) Chip; and (b) one or more use controlled components (UCCs) in data communication with the IUC Chip; (c) wherein each UCC is capable of at least one use; and (d) wherein, if any UCC fails to receive a correct IUC Chip ID Number from the IUC Chip, then that UCC becomes inoperative for its use.

2. The integrated use control system of any preceding embodiment, whereby each use controlled component (UCC) comprises: (a) a use control Integrated Circuit (IC); (b) whereby the UCC is capable for its use only upon approval by the use control Integrated Circuit (IC).

3. The integrated use control system of any preceding embodiment, whereby the data communication between each UCC and the IUC circuit comprises Bidirectional Digital Communications (BDC).

4. The integrated use control system of any preceding embodiment, wherein the use controlled component (UCC) is selected from a group of components consisting of: a sensor, a reader, a scanner, an imaging device, a detector, a receiver, a global positioning system, a navigation device, a control surface, a control valve, a power supply, a control device, a logic controller, an actuator, a transmitter, a transducer, a receiver, a communication system, an energy storage device, an energy delivery device, a power delivery device, a motor, an engine, a steering device, an initiating device, a voting machine, a Pitot tube, an aileron, an engine throttle, a communication link, a closed circuit television camera (CCTV), an access control device, a remotely operated electrical switch gear, a vehicle sensor, a railroad track switch, a mixer, a valve, a flow control device, a detonator, a weapon system fire control, a Power Source, a Command Switch, an Intent Signal Link, a Trajectory Stronglink, a Fireset, and a Detonator Strong Link.

5. The integrated use control system of any preceding embodiment, wherein the use controlled component (UCC) is selected from a group of components consisting of: an Input Use Controlled Component (I-UCC), and an Output Use Controlled Component (O-UCC).

6. The integrated use control system of any preceding embodiment, further comprising: (a) an Initialization Unit (IU) detachably in data communication with the IUC Chip; (b) whereby the IUC Chip is initialized by the IU while in data communication with the IU.

7. The integrated use control system of any preceding embodiment, wherein the IUC Chip is initialized by the IU using a programming executable on the IU executing steps comprising: (a) detecting, on a detector, a random physical process; (b) transmitting a periodic output of counts from the detector sensing the random physical process to the IU; (c) selecting n bits from a series of the periodic output of counts to fill a large buffer on the IU with a sequence of random bits; (d) selecting a portion of the large buffer to form one or more IU very large random numbers (VLRNs); (e) setting an IU Identification (ID) Number from one of the IU VLRNs; (f) transmitting the IU Identification (ID) Number to the IUC Chip; and (g) transmitting the large buffer from the IU to the IUC Chip.

8. The integrated use control system of any preceding embodiment, wherein the IUC Chip programming executable is stored on a computer readable medium.

9. The integrated use control system of any preceding embodiment, wherein the IUC Chip completes initialization by using a programming executable on the IUC Chip executing steps comprising: (a) selecting a portion of the large buffer transmitted from the IU to the IUC Chip to form one or more IUC Chip very large random numbers (VLRNs); (b) setting an IUC Chip Identification (ID) Number from one of the IUC Chip VLRNs; and (c) transmitting IUC Chip ID Number to the IU.

10. The integrated use control system of any preceding embodiment, wherein the IUC Chip completes IUC system initialization by using a programming executable on the IUC Chip executing steps comprising: (a) selecting a UCC Chip Identification (ID) Number from one of the IUC Chip VLRNs for each of the UCCs; (b) transmitting each selected UCC Chip ID Number to a corresponding UCC; and (c) transmitting the IUC Chip ID Number to each of the UCCs.

11. The integrated use control system of any preceding embodiment, wherein the IUC Chip completes IUC system initialization by using a programming executable on the IUC Chip executing steps comprising: (a) selecting from the UCCs a group of Input UCCs (I-UCCs) and a group of Output UCCs (O-UCCs); (b) selecting a Status-Condition Number from one of the IUC Chip VLRNs for each of the group of I-UCCs; (c) transmitting each selected Status-Condition Number from the IUC Chip to a corresponding I-UCC; (d) selecting a Control-Enable Number from one of the IUC Chip VLRNs for each of the group of O-UCCs; and (e) transmitting each selected Control-Enable Number from the IUC Chip to a corresponding O-UCC.

12. An Intrinsic Use Control System operational validation method, comprising: (a) providing an Intrinsic Use Control (IUC) Chip with an IUC Chip Identification (ID) Number; (b) providing one or more Use Controlled Components (UCCs), each having a UCC Identification (ID) Number, and an enabled intended function; (c) storing on the IUC Chip each UCC ID Number; (d) storing on each UCC the IUC Chip ID Number; and (e) periodically polling, by a program executable on the IUC Chip, each of the UCCs to confirm that: (i) each UCC ID Number corresponds to the UCC ID Number stored on the IUC Chip; and (ii) the IUC Chip ID Number transmitted from the IUC Chip corresponds to the IUC Chip ID Number stored on the UCC.

13. The Intrinsic Use Control System operational validation method of any preceding embodiment, wherein the IUC Chip program executable is stored on a computer readable medium.

14. The Intrinsic Use Control System operational validation method of any preceding embodiment, further comprising: if any polling result is unsuccessful, then transmitting from the IUC Chip to all UCCs a command disabling the UCC from its intended function.

15. A method of generating very large random numbers (VLRNs), comprising: (a) providing a Geiger counter output of periodic counts from a detector sensing radioactive decay from a radioactive source; (b) forming an array where each element of the array is one of the periodic counts; (c) concatenating n least significant bits from m successive array elements to form a sequence of random bits in a large buffer; and (d) selecting a portion of sequence of random bits within the large buffer to form one or more very large random numbers (VLRNs).

16. The method of generating very large random numbers of any preceding embodiment, wherein the very large random numbers (VLRNs) are large in a digital encryption sense, and therefore have odds of guessing a given VLRN less than a billion to one.

17. The method of generating very large random numbers of any preceding embodiment, wherein the very large random numbers (VLRNs) are greater than or equal to 30 bits in length.

18. A method of integrated use control, comprising: (a) providing an Intrinsic Use Control (IUC) Chip; (b) providing one or more use controlled components (UCCs), each with communication available to the IUC Chip, and each with an intended function; (c) initializing the one or more of the UCCs with the IUC Chip; (d) periodically polling at least one of the UCCs by the IUC Chip, each polling resulting in either: (i) a successful bidirectional identification of the polled UCC to the IUC Chip; or (ii) an unsuccessful bidirectional identification of the polled UCC to the IUC Chip; and (e) upon the polling result being unsuccessful, discontinuing the operation of the UCC with the unsuccessful polling result.

19. The method of integrated use control of any preceding embodiment, further comprising: if the unsuccessful bidirectional identification results, then rendering inoperable the intended function of all UCCs in communication with the IUC Chip.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An integrated use control system, comprising:
   (a) an Intrinsic Use Control (IUC) Chip; and
   (b) one or more use controlled components (UCCs) in data communication with the IUC Chip;
   (c) wherein each UCC is capable of at least one use; and
   (d) wherein, if any UCC fails to receive a correct IUC Chip ID Number from the IUC Chip, then that UCC becomes permanently inoperative for its use;
   (e) an Initialization Unit (IU) detachably in data communication with the IUC Chip;
   (f) whereby the IUC Chip is initialized by the IU while in data communication with the IU;
   (g) wherein the IUC Chip is initialized by the IU using a programming executable on the IU executing steps comprising:
      (1) detecting, on a detector, a random physical process;
      (2) transmitting a periodic output of counts from the detector sensing the random physical process to the IU;
      (3) selecting n bits from a series of the periodic output of counts to fill a large buffer on the IU with a sequence of random bits;
      (4) selecting a portion of the large buffer to form one or more IU very large random numbers (VLRNs);
      (5) setting an IU Identification (ID) Number from one of the IU VLRNs;
      (6) transmitting the IU Identification (ID) Number to the IUC Chip; and
      (7) transmitting the large buffer from the IU to the IUC Chip.

2. The integrated use control system of claim 1, wherein the IUC Chip programming executable is stored on a computer readable medium.

3. The integrated use control system of claim 1, wherein the IUC Chip completes initialization by using a programming executable on the IUC Chip executing steps comprising:
   (a) selecting a portion of the large buffer transmitted from the IU to the IUC Chip to form one or more IUC Chip very large random numbers (VLRNs);
   (b) setting an IUC Chip Identification (ID) Number from one of the IUC Chip VLRNs; and
   (c) transmitting IUC Chip ID Number to the IU.

4. The integrated use control system of claim 3, wherein the IUC Chip completes IUC system initialization by using a programming executable on the IUC Chip executing steps comprising:
   (a) selecting a UCC Chip Identification (ID) Number from one of the IUC Chip VLRNs for each of the UCCs;
   (b) transmitting each selected UCC Chip ID Number to a corresponding UCC; and
   (c) transmitting the IUC Chip ID Number to each of the UCCs.

5. The integrated use control system of claim 4, wherein the IUC Chip completes IUC system initialization by using a programming executable on the IUC Chip executing steps comprising:
   (a) selecting from the UCCs a group of Input UCCs (I-UCCs) and a group of Output UCCs (O-UCCs);
   (b) selecting a Status-Condition Number from one of the IUC Chip VLRNs for each of the group of I-UCCs;
   (c) transmitting each selected Status-Condition Number from the IUC Chip to a corresponding I-UCC;
   (d) selecting a Control-Enable Number from one of the IUC Chip VLRNs for each of the group of O-UCCs; and
   (e) transmitting each selected Control-Enable Number from the IUC Chip to a corresponding O-UCC.

* * * * *